United States Patent
Kopecek

(10) Patent No.: US 11,255,294 B2
(45) Date of Patent: Feb. 22, 2022

(54) THRUST REVERSER VELOCITY CONTROL VALVE

(71) Applicant: Woodward, Inc., Fort Collins, CO (US)

(72) Inventor: Joseph Thomas Kopecek, Santa Clarita, CA (US)

(73) Assignee: Woodward, Inc., Fort Collins, CO (US)

( * ) Notice: Subject to any disclaimer, the term of this patent is extended or adjusted under 35 U.S.C. 154(b) by 19 days.

(21) Appl. No.: 16/884,995

(22) Filed: May 27, 2020

(65) Prior Publication Data

US 2020/0355140 A1 Nov. 12, 2020

Related U.S. Application Data

(62) Division of application No. 15/867,142, filed on Jan. 10, 2018, now Pat. No. 10,704,497.

(51) Int. Cl.
*F02K 1/76* (2006.01)
*F02K 1/72* (2006.01)
*F02K 3/06* (2006.01)

(52) U.S. Cl.
CPC .............. *F02K 1/763* (2013.01); *F02K 1/72* (2013.01); *F02K 3/06* (2013.01);
(Continued)

(58) Field of Classification Search
CPC ..... F02K 1/70; F02K 1/72; F02K 1/76; F02K 1/763; F05D 2270/64; F15B 15/02; F15B 15/063
See application file for complete search history.

(56) References Cited

U.S. PATENT DOCUMENTS 4,391,409 A 7/1983 Scholz
5,381,654 A 1/1995 Halin
(Continued)

FOREIGN PATENT DOCUMENTS

EP 0801221 10/1997
EP 2466101 6/2012
GB 2446441 8/2008

OTHER PUBLICATIONS

International Search Report and Written Opinion in International Application No. PCT/US2019/012962, dated Apr. 3, 2019, 15 pages.
(Continued)

*Primary Examiner* — Andrew H Nguyen
(74) *Attorney, Agent, or Firm* — Fish & Richardson P.C.

(57) ABSTRACT

The subject matter of this specification can be embodied in, among other things, a turbofan engine assembly includes a engine, a nacelle defining a generally forward-to-aft bypass air flow path, a thrust reverser comprising a first movable element, movable to and from a reversing position where at least a portion of the bypass air flow is reversed, a hydraulic actuator coupled to the first movable element to move the first movable element into and out of the reversing position, and a second moveable element, configured to move in synchronicity with the first moveable element, a first hydraulic valve operable to control a flow of hydraulic fluid for actuation of the hydraulic actuator, a second hydraulic valve operably coupled to the second moveable element and moveable between a restricted condition wherein the flow of hydraulic fluid is restricted, and a permit condition wherein the flow of hydraulic fluid is permitted.

15 Claims, 9 Drawing Sheets

(52) U.S. Cl.
CPC .... *F05D 2220/323* (2013.01); *F05D 2240/14* (2013.01); *F05D 2260/406* (2013.01)

(56) References Cited

U.S. PATENT DOCUMENTS

| | | |
|---|---|---|
| 5,609,020 A | 3/1997 | Jackson et al. |
| 8,110,111 B1 | 5/2012 | Calmelat et al. |
| 8,904,751 B2 | 12/2014 | Howarth et al. |
| 9,366,201 B2 | 6/2016 | Caruel |
| 2014/0305299 A1 | 10/2014 | Vanderveen et al. |
| 2015/0090810 A1 | 4/2015 | Lallement et al. |
| 2016/0123355 A1 | 5/2016 | Collins |
| 2019/0211776 A1 | 7/2019 | Kopecek |

OTHER PUBLICATIONS

Kopecek, Thrust Reverser Flow Limiting Valve*, U.S. Appl. No. 15/423,249, filed Feb. 2, 2017, 32 pages.

International Preliminary Report on Patentability in International Appln. No. PCT/US2019/012962, dated Jul. 23, 2020, 9 pages.

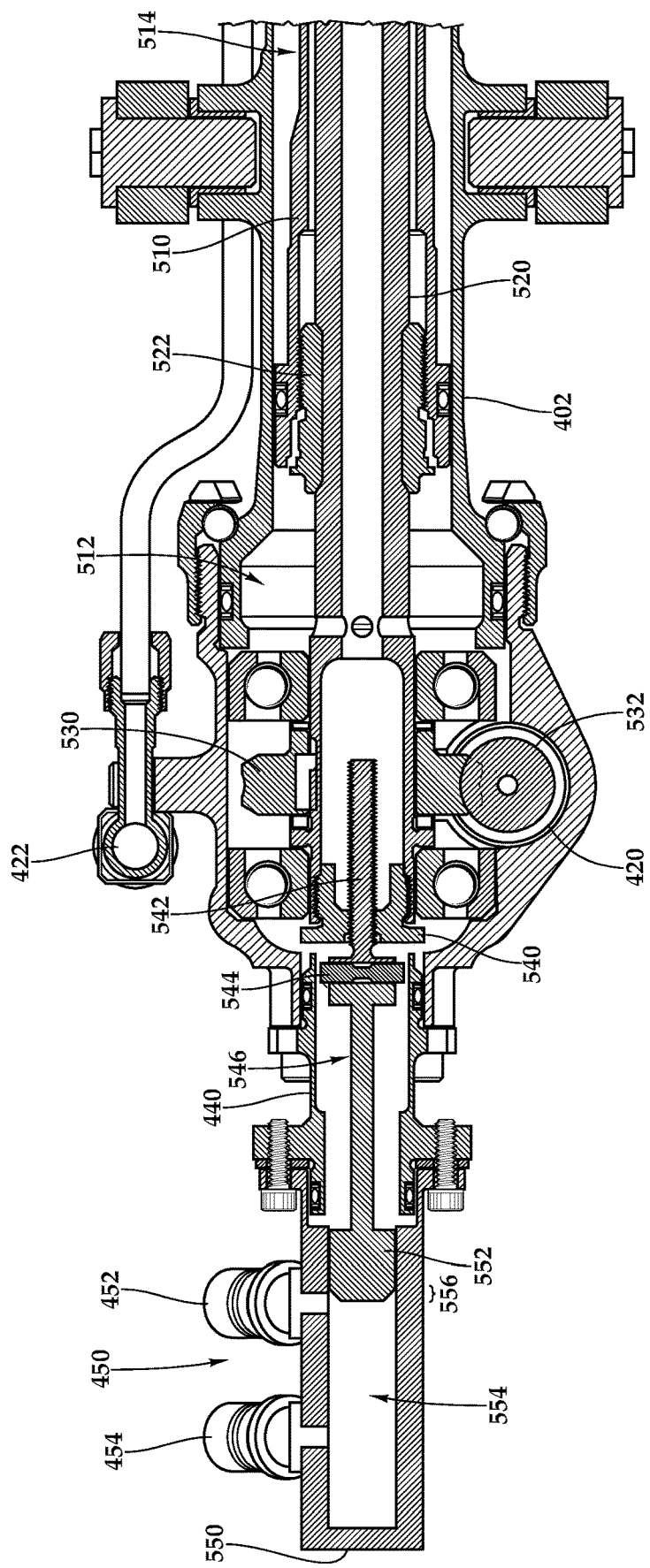

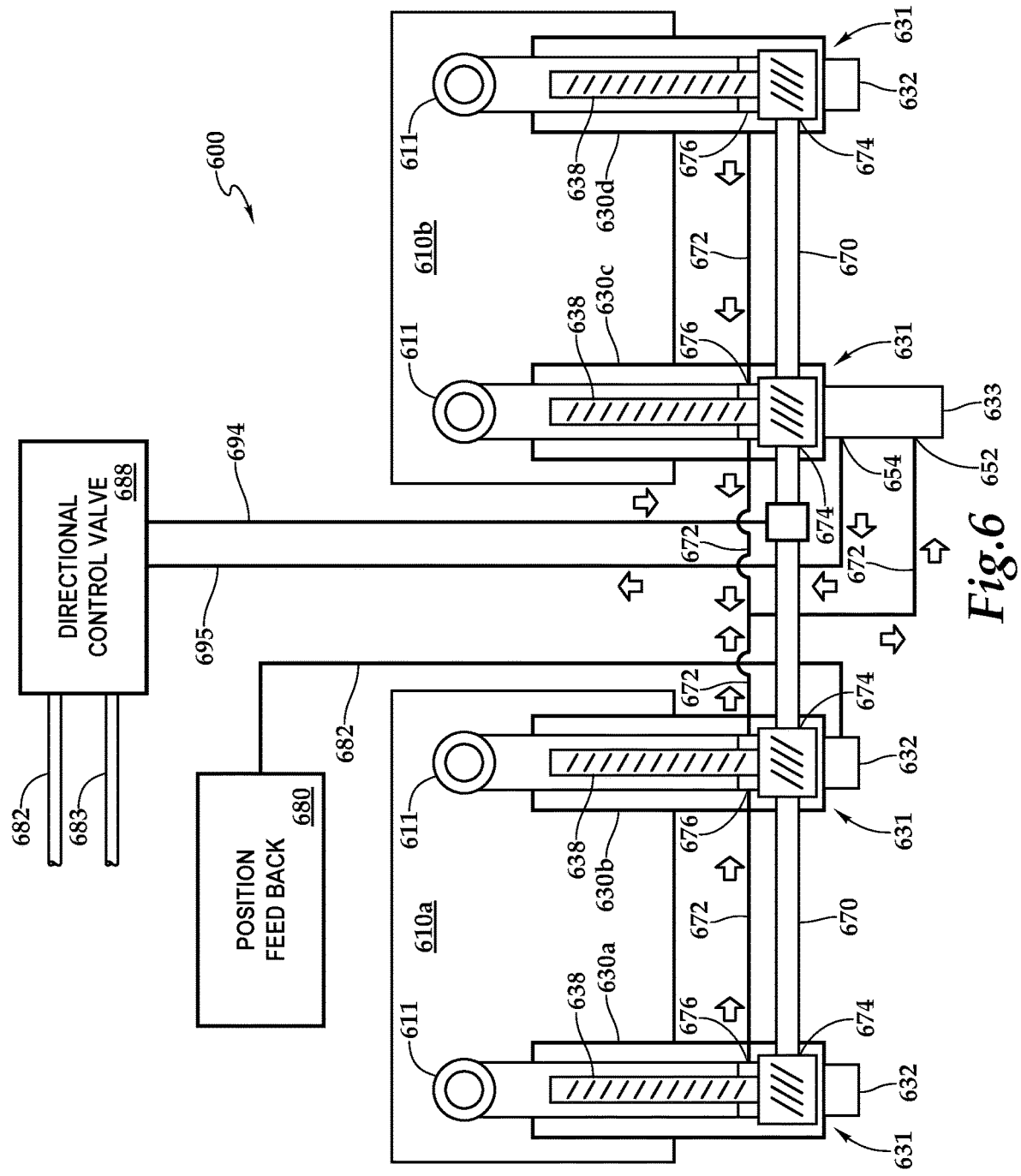

THRUST REVERSER VELOCITY CONTROL VALVE

CROSS-REFERENCE TO RELATED PATENT APPLICATIONS

This application is a divisional of and claims the benefit of priority to U.S. patent application Ser. No. 15/867,142, filed Jan. 10, 2018, the contents of which are incorporated by reference herein.

TECHNICAL FIELD

This instant specification relates to an aircraft thrust reverser actuation system.

BACKGROUND

Contemporary aircraft engines may include a thrust reverse actuation system to assist in reducing the aircraft speed during landing. Typical thrust reversers include one or more movable transcowls that, when in the active position, reverse at least a portion of the airflow passing through the engine.

The transcowls are moved by hydraulic power provided through thrust reverser actuators. As the transcowls are moved into and out of the active reversing position, the loads imposed upon the thrust reverser actuators can assist or resist the movement of the actuators, and these forces can change drastically in magnitude and/or direction during deployment or stow operations for the transcowls.

SUMMARY

In general, this document describes an aircraft thrust reverser actuation system.

In a first aspect, a turbofan engine assembly includes a turbofan engine, a nacelle surrounding the turbofan engine and defining an annular bypass duct through the turbofan engine to define a generally forward-to-aft bypass air flow path, a thrust reverser comprising a first movable element, movable to and from a reversing position where at least a portion of the bypass air flow is reversed, a hydraulic actuator coupled to the first movable element to move the first movable element into and out of the reversing position, and a second moveable element, configured to move in synchronicity with the first moveable element, a first hydraulic valve operable to control a flow of hydraulic fluid for actuation of the hydraulic actuator, a second hydraulic valve operably coupled to the second moveable element and moveable between a restricted condition wherein the flow of hydraulic fluid is restricted, and a permit condition wherein the flow of hydraulic fluid is permitted.

Various embodiments can include some, all, or none of the following features. The second hydraulic valve can be further moveable to an inhibit condition wherein the flow of hydraulic fluid is substantially blocked. The second hydraulic valve can include a valve housing defining a valve cavity, a fluid inlet, a fluid outlet, and a valve slide configured for reciprocal movement within the cavity between the permit condition wherein the valve slide and the valve housing define a fluid circuit between the fluid inlet and the fluid outlet, and the restricted condition wherein the fluid circuit is restricted. The valve housing can be coupled to the thrust reverser and the valve slide is operably coupled to the second moveable element. The valve slide can include a geometric profile configured to provide a preconfigured variation of fluid flow rates through the fluid circuit based on a linear position of the valve slide between the permit condition and the restricted condition. The second hydraulic valve can be a rotary valve having a fluid inlet, a fluid outlet, and a valve core configured for rotational movement between the permit condition wherein the valve core defines a fluid circuit between the fluid inlet and the fluid outlet, and the restricted condition wherein the fluid circuit is restricted. The second moveable element can be configured to move at a linear speed that is proportional to and different from at least one of a linear speed and a linear direction of the first moveable element. The hydraulic actuator can include a linear-to-rotary rotary drive assembly configured to rotate based on movement of the first moveable element, and the second moveable element comprises a screw assembly coupled to the linear-to-rotary drive assembly and configured thread and unthread a screw to linearly extend and linearly retract the screw based on rotation of the rotary drive assembly, and a guide plate configured to contact the screw on a first side, contact the second hydraulic valve on a second side opposite the first side, and move linearly based on linear extension and linear retraction of the screw.

In a second aspect, a thrust reverser includes a first movable element, movable to and from a reversing position where at least a portion of the bypass air flow is reversed, a hydraulic actuator comprising at least one fluid chamber and coupled to the first movable element to move the first movable element into and out of the reversing position based a flow of hydraulic fluid though the fluid chamber, and a second moveable element, configured to move in synchronicity with the first moveable element, and a hydraulic valve coupled to the second moveable element and moveable between an restricted condition wherein the flow of hydraulic fluid is restricted, and a permit condition wherein the flow of hydraulic fluid is permitted.

Various embodiments can include some, all, or none of the following features. The second hydraulic valve can be further moveable to an inhibit condition wherein the flow of hydraulic fluid is substantially blocked. The second hydraulic valve can include a valve housing defining a valve cavity, a fluid inlet, a fluid outlet, and a valve slide configured for reciprocal movement within the cavity between the permit condition wherein the valve slide and the valve housing define a fluid circuit between the fluid inlet and the fluid outlet, and the restricted condition wherein the fluid circuit is restricted. The valve housing can be coupled to the thrust reverser and the valve slide is operably coupled to the second moveable element. The valve slide can include a geometric profile configured to provide a preconfigured variation of fluid flow rates through the fluid circuit based on a linear position of the valve slide between the permit condition and the restricted condition. The second hydraulic valve can include a rotary valve including a fluid inlet, a fluid outlet, and a valve core configured for rotational movement between the permit condition wherein the valve core defines a fluid circuit between the fluid inlet and the fluid outlet, and the restricted condition wherein the fluid circuit is restricted. The second moveable element can be configured to move at a linear speed that is proportional to and different from at least one of a linear speed and a linear direction of the first moveable element. The hydraulic actuator can include a linear-to-rotary rotary drive assembly configured to rotate based on movement of the first moveable element, and the second moveable element comprises a screw assembly coupled to the linear-to-rotary drive assembly and configured thread and unthread a screw to linearly extend and linearly retract the screw based on rotation of the rotary drive assembly, and a guide plate configured to contact the screw on a first side, contact the second hydraulic valve on a second side opposite the first side, and move linearly based on linear extension and linear retraction of the screw.

In a third aspect, a method of controlling hydraulic actuation includes flowing a hydraulic fluid flow through a hydraulic actuator, urging, by the hydraulic actuator based on the hydraulic fluid flow, movement of a first moveable element into and out of a reversing position, urging, by the hydraulic actuator based on the hydraulic fluid flow, movement of a second moveable element in synchronicity with the first moveable element, urging, by movement of the second moveable element, a hydraulic valve coupled to the second moveable element, to a restricted condition, restricting, by the hydraulic valve and based on the restricted condition, the hydraulic fluid flow, urging, by movement of the second moveable element, the hydraulic valve to a permit condition, and permitting, by the hydraulic valve and based on the permit condition, the hydraulic fluid flow.

Various implementations can include some, all, or none of the following features. The method can also include urging, by movement of the second moveable element, the hydraulic valve to an inhibit condition, and inhibiting, by the hydraulic valve and based on the inhibit condition, the hydraulic fluid flow such that the hydraulic fluid flow is substantially blocked. Urging, by the hydraulic actuator based on the hydraulic fluid flow, movement of the second moveable element in synchronicity with the first moveable element can also include moving a valve slide within a valve cavity defined by a valve housing between the permit condition wherein the valve slide and the valve housing define a fluid circuit between a fluid inlet and the fluid outlet, and the restricted condition wherein the fluid circuit is restricted. The method can also include providing a preconfigured variation of fluid flow rates through the fluid circuit based on movement of the valve slide, wherein the valve slide comprises a geometric profile configured to provide the preconfigured variation of fluid flow rates through the fluid circuit based on a linear position of the valve slide between the permit condition and the restricted condition. Urging, by the hydraulic actuator based on the hydraulic fluid flow, movement of a second moveable element in synchronicity with the first moveable element can also include moving the second moveable element at a linear speed that is proportional to and different from at least one of a linear speed and a linear direction of the first moveable element.

In a fourth aspect, a valve apparatus includes a housing having a mounting point configured to removably affix the housing to a sensor mounting point of a thrust reverser actuator, a fluid inlet, a fluid outlet, a moveable member configured to be actuated by a thrust reverser actuator feedback screw and moveable between a restricted condition wherein a fluid path defined within the housing between the fluid inlet and the fluid outlet is restricted, and a permit condition wherein the fluid path is substantially unrestricted.

Various embodiments can include some, all, or none of the following features. The valve apparatus can also include a fluid conduit connecting at least one of the fluid inlet to a thrust reverser actuator fluid outlet, and the fluid outlet to a thrust reverser actuator fluid inlet.

The systems and techniques described here may provide one or more of the following advantages. First, a system can provide fine resolution control of reverser velocity. Second, the system can provide for control of the reverser deploy action, stow action, or both. Third, the system can reduce end of travel impact velocity. Fourth, the system can reduce wear due to excessive velocity. Fifth, the system can reduce the cost and complexity associated with electrohydraulic servovalve type solutions for thrust reverser control. Sixth, the system can provide an end of travel snubbing function.

The details of one or more implementations are set forth in the accompanying drawings and the description below. Other features and advantages will be apparent from the description and drawings, and from the claims.

DESCRIPTION OF DRAWINGS

FIG. 5A is a cross sectional view of the example hydraulic actuator of FIG. 4.

FIG. 6 is a schematic view of an example thrust reverser system.

DETAILED DESCRIPTION

This document describes systems and techniques for reversing aircraft turbine engine airflow. A thrust reverser with at least one movable cowl element (i.e., at least one transcowl), which is movable to and from a reversing position, may be used to change the direction of the bypass airflow. In the reversing position, the movable cowl element may be configured to reverse at least a portion of the bypass airflow. As the moveable cowl element is moved into and out of the reversing position by a hydraulic actuator, the forces (e.g., thrust, air resistance) interacting with the moveable cowl element can cause sudden changes in load presented to the actuator. Such forces can be damaging to the system; for example, a hydraulic actuator may initially push the moveable cowl element from the stowed position toward the deployed position, and at some point mid-stroke the aerodynamic forces on the element may provide powerful additional forces that urge the moveable cowl element toward deployment. Such forces may cause the moveable cowl element and/or the actuator to hit their end of travel with an impact that is sufficient to cause damage to the system.

In general, the systems described below overcome this problem by using a hydraulic valve that controls fluid flow through the hydraulic actuator. The valve is mechanically linked to the actuator in a manner such that the valve can vary the fluid flow through the actuator depending on the position of the actuator. The valve can be constructed such that when in use, the fluid flow through the actuator can be restricted at predetermined positions, such as near an end of travel to resist assistive aerodynamic loads, for example, to slow actuator deployment or to soften impacts against the end of travel.

Conventional cascade type thrust reverser actuation systems have hydraulic actuators that include an arm that is attached to the moveable cowl element, and a feedback screw that moves in proportion to the arm. Such thrust reversers also have mounting points to which position sensors (e.g., LVDTs) can be attached. These position sensors are configured to sense the position of the feedback screw, and thereby provide a feedback signal that is representative of the position of the moveable cowl element. The valves described herein can be configured to attach to hydraulic actuators in place of such position sensors, and be actuated by the feedback screw.

Figure 1:
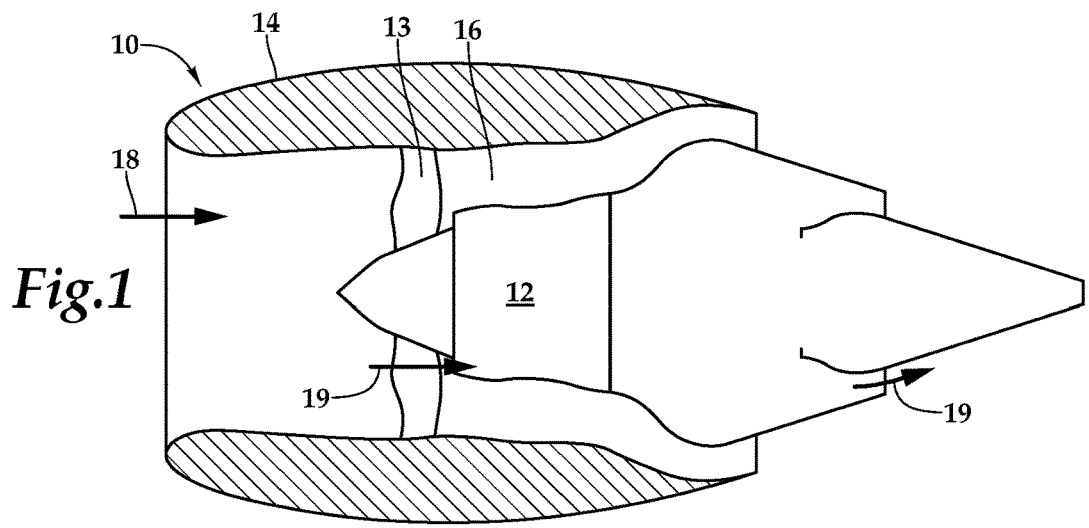
FIG. 1 is a schematic view of an example turbofan jet engine assembly with a portion of the outer nacelle cut away for clarity.

FIG. 1 illustrates an example turbofan jet engine assembly 10 having a turbine engine 12, a fan assembly 13, and a nacelle 14. Portions of the nacelle 14 have been cut away for clarity. The nacelle 14 surrounds the turbine engine 12 and defines an annular airflow path or annular bypass duct 16 through the jet engine assembly 10 to define a generally forward-to-aft bypass airflow path, as schematically illustrated by the arrow 18. A combustion airflow is schematically illustrated by the arrows 19.

Figure 2:
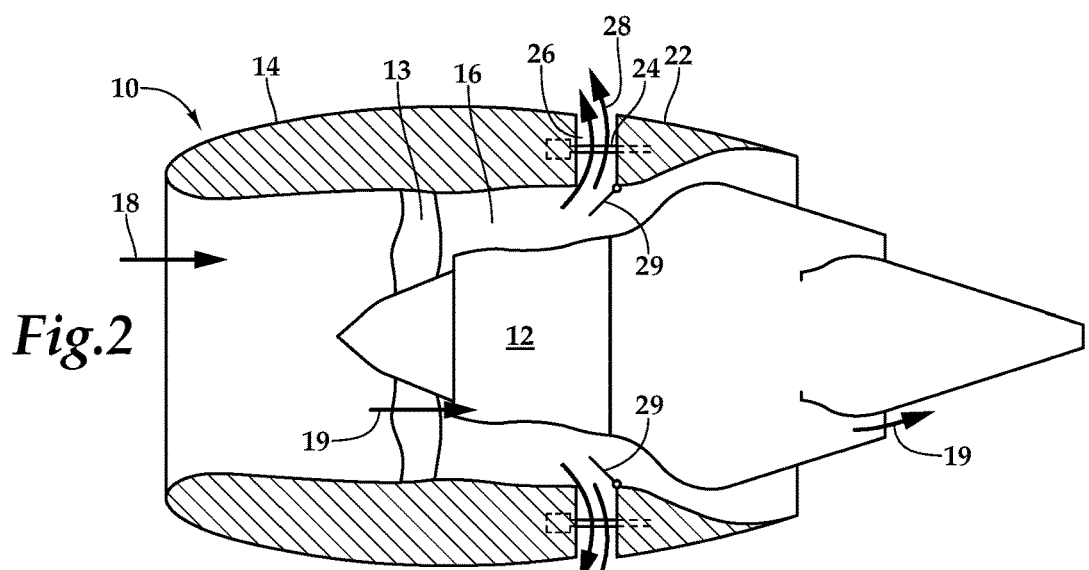
FIG. 2 is a schematic view of the engine assembly of FIG. 1 with an exemplary thrust reverser.

A thrust reverser with at least one movable element, which is movable to and from a reversing position, may be used to change the direction of the bypass airflow. In the reversing position, the movable element may be configured to reverse at least a portion of the bypass airflow. There are several methods of obtaining reverse thrust on turbofan jet engine assemblies. FIG. 2 schematically illustrates one example of a thrust reverser 20 that may be used in the turbofan jet engine assembly 10. The thrust reverser 20 includes a movable element 22. The movable element 22 has been illustrated as a cowl portion that is capable of axial motion with respect to the forward portion of the nacelle 14. A hydraulic actuator 24 may be coupled to the movable element 22 to move the movable element 22 into and out of the reversing position. In the reversing position, as illustrated, the movable element 22 limits the annular bypass area between the movable element 22 and the turbine engine 12, it also opens up a portion 26 between the movable element 22 and the forward portion of the nacelle 14 such that the air flow path may be reversed as illustrated by the arrows 28. An optional deflector or flap 29 may be included to aid in directing the airflow path between the movable element 22 and the forward portion of the nacelle 14.

Figure 3:
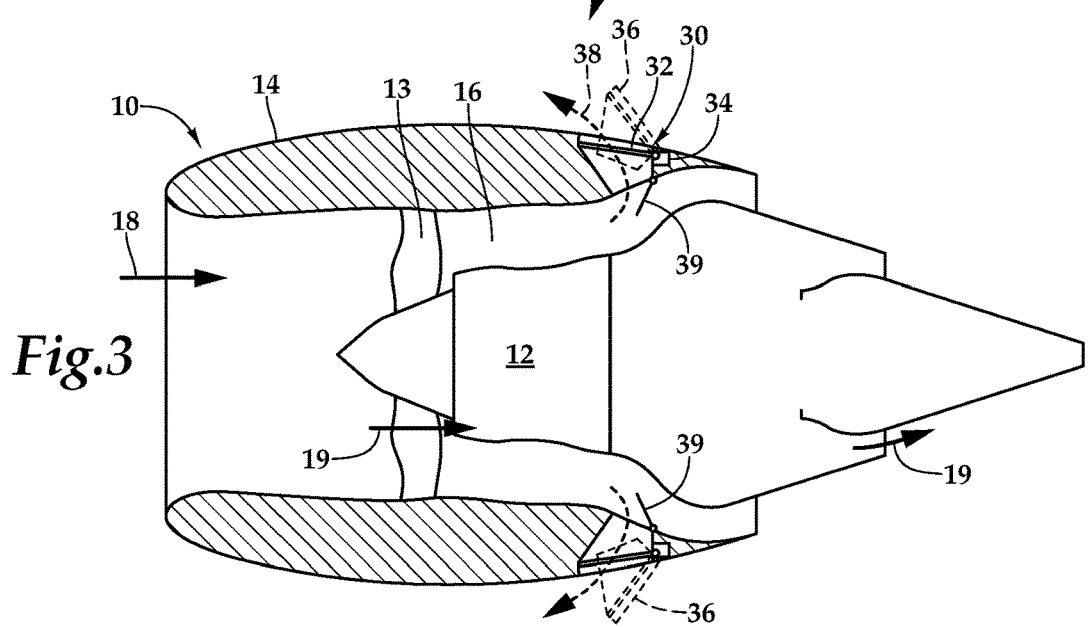
FIG. 3 is a schematic view of the engine assembly of FIG. 1 with an alternative exemplary thrust reverser.

FIG. 3 schematically illustrates an alternative example of a thrust reverser 30. The thrust reverser 30 includes a movable element 32. The movable element 32 has been illustrated as a deflector, which may be built into a portion of the nacelle 14. A hydraulic actuator 34 may be coupled to the movable element 32 to move the movable element 32 into and out of the reversing position. In the reversing position, shown in phantom and indicated at 36, the movable element 32 turns that air outward and forward to reverse its direction as illustrated by the arrows 38. An optional deflector or flap 39 may be included to aid in directing the airflow path outward.

In both illustrative examples, the thrust reverser changes the direction of the thrust force. Both the thrust reverser 20 and the thrust reverser 30 have been described as hydraulically operated systems and a hydraulic actuator has been schematically illustrated. In some embodiments, the thrust reverser 20 and/or the thrust reverser 30 can be powered by other fluids (e.g., pneumatic), by electro-mechanical actuators, or by any other appropriate power source or actuator type.

Figure 4:
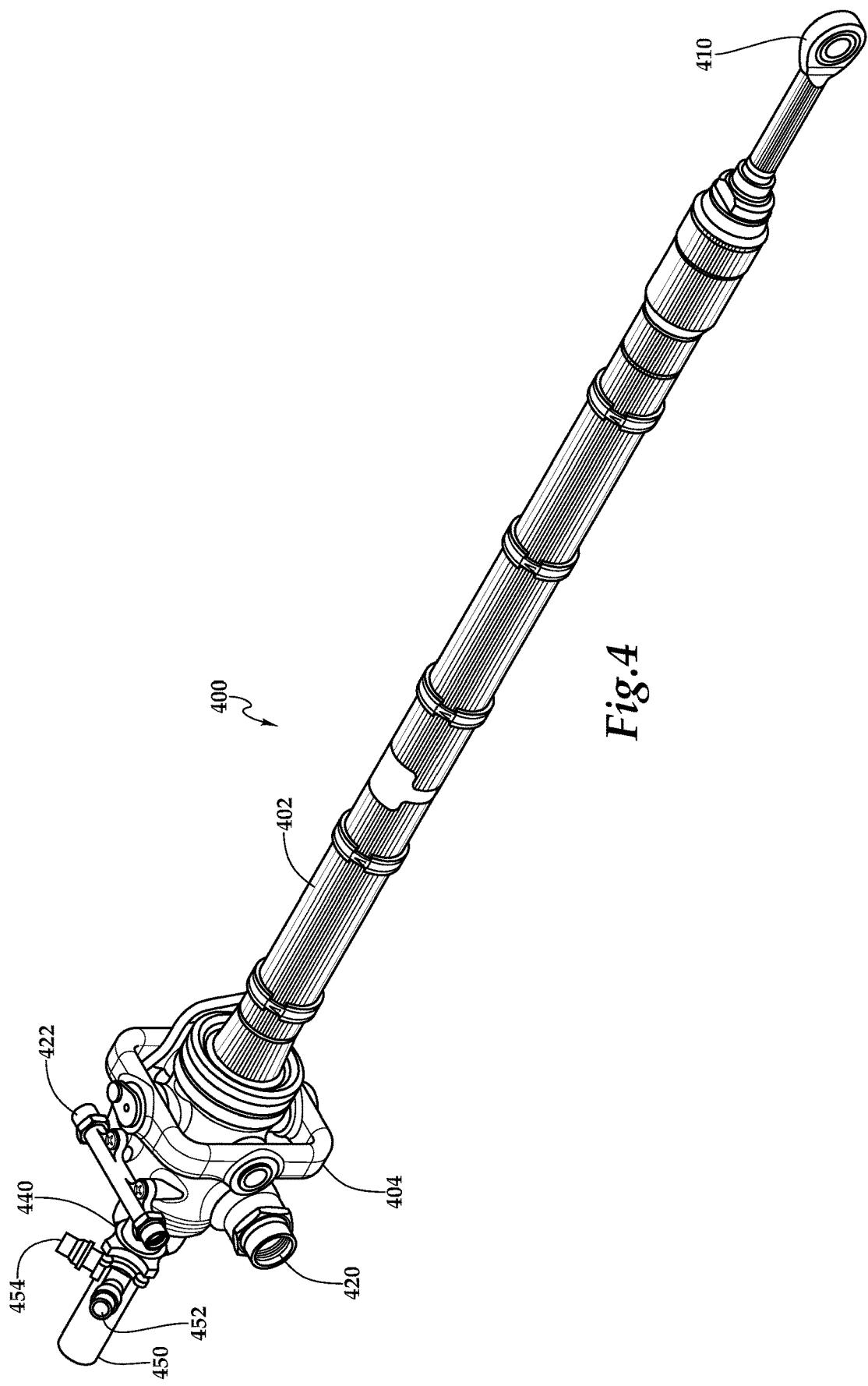
FIG. 4 is a perspective view of an example hydraulic actuator.

FIG. 4 is a perspective view of an example hydraulic actuator 400. In some embodiments, the hydraulic actuator 400 can be the example hydraulic actuator 24 of FIG. 2 or the example hydraulic actuator 34 of FIG. 3. The hydraulic actuator 400 includes a housing 402 and a gimbal 404. In some embodiments, the gimbal 404 can be configured to removably affix the housing 402 to a structural member, such as the example nacelle 14.

A rod end 410 is configured to extend and retract relative to the housing 402. In some embodiments, the rod end 410 can be configured to removably affix the hydraulic actuator 400 to a moveable element, such as the example moveable element 22 or the example moveable element 32. The rod end 410 is configured to extend and retract linearly, relative to the housing 402.

The hydraulic actuator 400 includes an actuator deploy port 420 and an actuator stow port 422. The hydraulic actuator 400 is configured to extend the rod end 410 when fluid (e.g., hydraulic fluid) is flowed to the actuator deploy port 420 and retract the rod end 410 when fluid is flowed to the actuator stow port 422.

The housing 402 includes a mount point 440. The mount point 440 is configured for the removable attachment of a position sensor such as an LVDT. However, in the illustrated example, a control valve 450 is removably affixed to the hydraulic actuator 400 at the mount point 440. The control valve 450 is a hydraulic valve that includes an inlet fluid port 452 and an outlet fluid port 454. The control valve 450 will be discussed further in the description of FIGS. 5A and 5B.

Figure 5B:
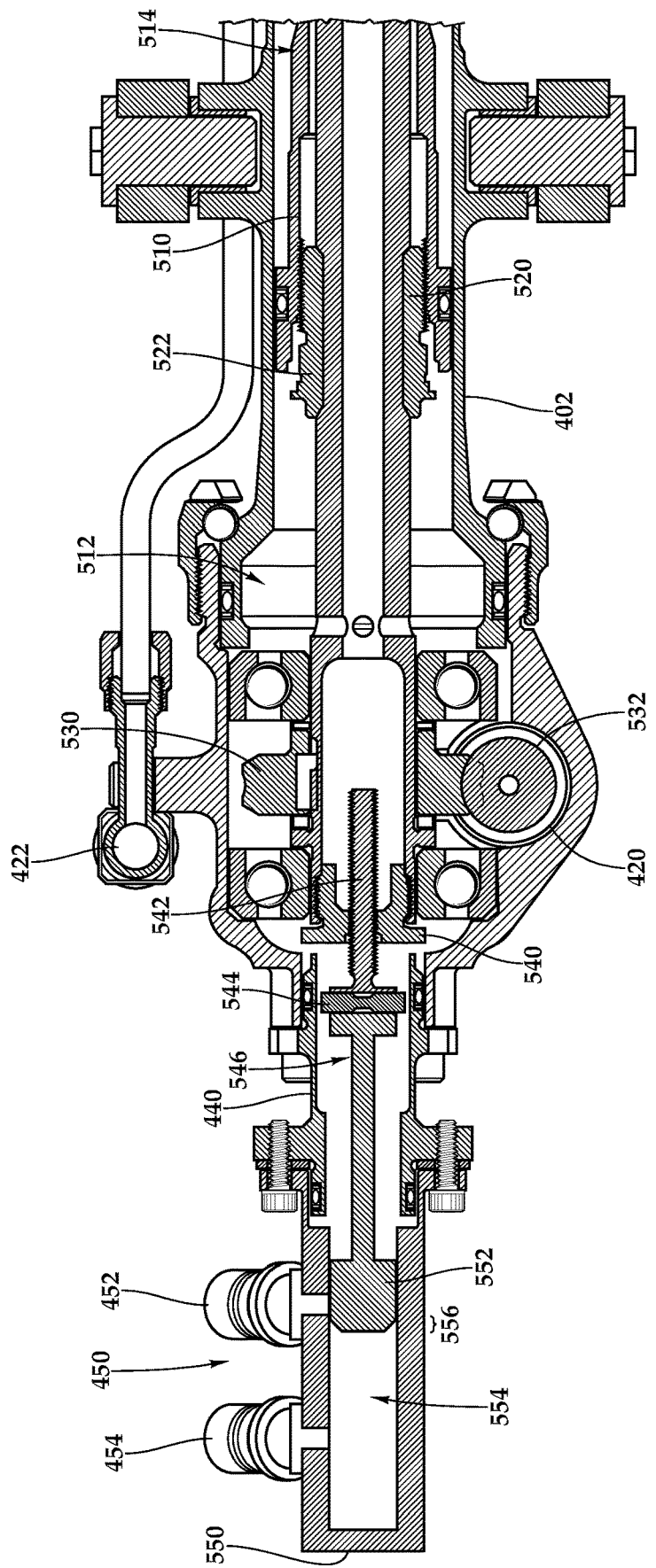
FIG. 5B is another cross sectional view of the example hydraulic actuator of FIG. 4.

FIGS. 5A and 5B are cross sectional views of a portion of the example hydraulic actuator 400 of FIG. 4. Visible in this view are the housing 402, the mount point 440, and the control valve 450 along with the inlet fluid port 452 and the fluid outlet port 454. The control valve 450 includes a control valve housing 550. FIG. 5A shows the control valve 450 is in a permit (e.g., flowable) configuration, whereas FIG. 5B shows the control valve 450 in a restrict (e.g., limited or blocked flow) configuration.

Also visible is a piston 510 and a lead screw 520. The piston 510, the lead screw 520, and the housing 502 define a fluid chamber 512 on one longitudinal side of the piston 510 and a fluid chamber 514 on the opposite longitudinal side of the piston 510. In operation, hydraulic fluid is provided through the actuator deploy port 420 (not shown in this view) to pressurize the first fluid chamber 512 and urge extensile, longitudinally outward movement of the piston 510 (e.g., to the right as illustrated), and hydraulic fluid is provided through the actuator stow port 422 to pressurize the second fluid chamber 514 and urge retractile, longitudinally inward movement of the piston 510 (e.g., to the left as illustrated). The piston 510 is coupled to the rod end 410 (not visible in this view). As such, application of fluid to the actuator deploy port 420 causes extension of the rod end 410 and thrust reverser members attached thereto, and application of fluid to the actuator stow port 422 causes retraction of the rod end 410 to stow thrust reverser members attached thereto.

The piston 510 is coupled to the lead screw 520 through a lead screw nut 522 to form a linear-to-rotary motion conversion apparatus. The lead screw nut 522 is attached to the piston 510, and has threads that mate with corresponding threads along the lead screw 520. As the lead screw nut 520 travels linearly with the piston 510, the lead screw nut 522 urges the lead screw 520 to rotate. Rotation of the lead screw 520, in turn, urges rotation of a worm wheel 530 and a worm shaft 532. In some embodiments, the worm shaft 532 can be coupled to a synchronization apparatus (e.g., sync shaft, cable) to provide mechanical synchronization among multiple thrust reverser actuators, as will be discussed further in the description of FIG. 6.

Rotation of the lead screw 520 urges rotation of a feedback nut 540. The feedback nut 540 has screw threads that engage corresponding mating threads of a feedback screw 542 to form a rotary-to-linear motion conversion apparatus. As the feedback nut 540 rotates, the feedback screw 542 is prevented from rotating, and as such, the feedback screw 542 is configured to thread and unthread linearly as the feedback nut 540 rotates clockwise and counterclockwise. The pitch and/or direction of the threads of the feedback nut 540 and the feedback screw 542 can be configured to control the rate and/or direction of linear movement of the feedback screw 542 proportional to the rotation of the feedback nut 540. For example, the threading can be configured to cause the feedback screw 542 to extend rapidly in response to clockwise rotation of the feedback nut 540, while in another example the threading can be configured to cause the feedback screw 542 to retract slowly in response to clockwise rotation of the feedback nut 540. As such, the linear movement of the feedback screw 542 may be in a different direction and/or speed compared to the linear movement of the piston 510.

The feedback screw 542 urges linear movement because feedback guide 544 provides anti-rotation to the feedback screw 542. The feedback guide 544 is configured to travel linearly within an axial linear slot in the housing cavity 546 defined within the mount point 440. The feedback guide 544 is configured to contact a control valve slide 552. The feedback guide 544 urges linear movement of a control valve slide 552. As such, movement and position of the control valve slide 552 is proportional to and representative of the position of the piston 510. The control valve slide 552 is configured to move at a linear speed that is proportional to and either the same are or different from at least one of a linear speed and a linear direction of the piston 510.

The control valve slide 552 is configured for reciprocal movement at least partly within the cavity 546 and/or at least partly within a cavity 554 defined within the control valve housing 550. The control valve slide 552 is moveable between a restricted condition wherein the flow of hydraulic fluid is restricted, and a permit condition wherein the flow of hydraulic fluid is permitted (as shown in FIG. 5A). In some embodiments, the control valve slide 552 can be further moveable to an inhibit condition wherein the flow of hydraulic fluid is substantially blocked (as shown in FIG. 5B).

The control valve slide 552 can be moved (e.g., slide, rotate) to selectively block, unblock, and variably restrict a fluid flow circuit between the inlet fluid port 452 and the outlet fluid port 454 based on the position of the control valve slide 552 within the cavity 554. The control valve slide 552 includes a profiled section 556 that is formed (e.g., machined, molded) with a geometric profile configured to provide a preconfigured variation of fluid flow rates through the fluid circuit based on a linear position of the control valve slide 552 between the permit condition and the restricted or blocked condition. In other words, the control valve slide 552 has a physical configuration that can adjust the flow capacity of the fluid flow path as the control valve slide 552 moves. For example, the profiled section 556 can have a profile that allows substantially unrestricted fluid flow (e.g., relative to the capacity of the control valve 450) as the control valve slide 552 moves from a starting end position to a midpoint position, and can increasingly restrict fluid flow from being substantially unrestricted flow at the midpoint to a 90% restricted flow at an ending end position.

The feedback guide 544 rides back and forth in an axial slot (not shown) to provide anti-rotation for the valve slide 552. The valve slide 552 also substantially seals the cavity 546 and substantially prevents fluid leakage from the valve cavity 554 to deploy chamber 512. In some embodiments, if the sealing of the valve slide creates too much of a load on the feedback screw 542 (e.g., because of the differential pressure between the fluid chamber 512 and the cavity 554), an alternative means of fluid isolation can be provided.)

As such, the hydraulic actuator 400 comprises a linear-to-rotary rotary drive assembly configured to rotate based on movement of the piston 510, and the control valve slide 552 is driven by a screw assembly (e.g., the feedback nut 540, the feedback screw 542) coupled to the linear-to-rotary drive assembly and configured thread and unthread the feedback screw 542 to linearly extend and linearly retract the feedback screw 542 based on rotation of the rotary drive assembly (e.g., the lead screw 520, the lead screw nut 522), and a guide plate (e.g., the feedback guide 544) configured to contact the feedback screw 542 on a first side, contact the control valve slide 552 of the control valve 450 on a second side opposite the first side, and move linearly based on linear extension and linear retraction of the feedback screw 542.

In the illustrated example, the control valve 450 is a linear valve. In some other examples, the control valve 450 can be a rotary valve configured for rotational movement between the permit condition wherein the valve core defines a fluid circuit between the fluid inlet and the fluid outlet, and the restricted condition wherein the fluid circuit is restricted.

In some examples, a retracted thrust reverser may not incur significant air drag and may not apply significant tension to the piston 510 at a retracted position. As such, during initial deployment of the thrust reverser, the force placed on the piston 510 may be mostly compressive. However, at some intermediate position during deployment, the thrust reverser may start being affected by engine thrust and/or air drag, at which point the piston 510 may be put into tension. If left uncontrolled (e.g., without use of the control valve 450), such forces could cause the thrust reverser to deploy too rapidly, and/or cause the piston 510 to hit a mechanical hard (e.g., end) stop with a great deal of force, causing damage to the hydraulic actuator 400 or surrounding equipment.

The configuration of the profiled section 556 of the control valve 450 affects the behavior of the hydraulic actuator 400. In use, the control valve 450 is fluidly connected in series with the hydraulic fluid actuator 400. For example, pressurized hydraulic fluid can be flowed into actuator deploy port 420 to displace the piston 510, and movement of the piston 510 can displace a hydraulic fluid out through the actuator stow port 422. The output of the actuator stow port can be fluidly connected to the inlet fluid port 452 to flow though the control valve 450 to the outlet fluid port 454. The control valve slide 552 is configured to move in synchronicity with the piston 510. For example, as discussed above, as the piston 510 is moved the control valve slide 552 moves proportionally.

Since the profile of the profiled section 556 is configured to provide a predefined variable restriction in fluid flow between the inlet fluid port 452 and the outlet fluid port 454 that is based on the position of the piston 510, the control valve 450 reduces and/or resists position-dependent force changes imposed on a thrust reverser. For example, the control valve 450 can provide substantially little additional resistance to the outflow of fluid from the outlet fluid port 454 when the piston 510 is substantially stowed, and then provide a relatively greater restriction as the piston 510 is extended to a partly deployed position. Such restrictions can provide partial or complete hydraulic blocking of the ouflow of hydraulic fluid from the outlet fluid port 454. In use, the control valve slide 552 can be configured (e.g., shaped) to provide predetermined amounts of restriction and hydraulic blocking to resist varying amounts of force imposed upon the hydraulic fluid actuator 400 at the example thrust reversers 20 or 30 of FIGS. 2 and 3 are deployed into air and/or jet streams.

The magnitudes of forces and the positions at which they are incurred can be different for different combinations of thrust reversers and thrust reverser actuators. In some embodiments, the control valve slide 552 can be exchanged for a differently profiled control valve slide to change the variable flow behavior of the control valve 450. For example, a first example of the control valve 450 may have a first control valve slide 552 configured to control the action of a Model "M" thrust reverser actuator coupled to a Model "N" thrust reverser, and a second example of the control valve 450 may have a differently-profiled second control valve slide 552 configured to control the action of a Model "X" thrust reverser actuator coupled to a Model "Y" thrust reverser.

FIG. 6 is a schematic view of an example thrust reverser system 600. In some embodiments, the thrust reverser system 600 can include some or all of the example thrust reverser 20 of FIG. 2, the example thrust reverser 30 of FIG. 3, and/or the example thrust reverser 400 of FIGS. 4, 5A and 5B. In some embodiments, the example turbofan jet engine assembly 10 of FIGS. 1-3 can include the example thrust reverser system 600.

A moveable transcowl portion 610a is affixed to a rod end 611 of a synchronized actuator 630a and a synchronized actuator 630b. A moveable transcowl portion 610b is affixed to the rod end 611 of a synchronized actuator 630c and a synchronized actuator 630d. In the illustrated example, the moveable transcowl portions 610a and 610b are show as being flat (e.g., planar) only for ease of viewing. In their intended form, the moveable transcowl portions 610a and 610b both have a semi-tubular (e.g., half-cylinder) shape, such that when brought together in a closed configuration the moveable transcowl portions 610a and 610b form a generally tubular, cylindrical, or conic section that can surround a portion of a turbine engine. For example, the moveable transcowl portions 610a and 610b can be the example movable element 22 or the moveable element 32.

The moveable transcowl portion 610a is affixed to an aircraft wing, fuselage, or other structural member. The moveable transcowl portion 610b is also affixed to the aircraft wing, fuselage, or other structural member.

The synchronized actuators 630a-630d each have a proximal end 631 affixed to the nacelle or other substantially stationary portion of the engine, and a moveable end 638 (e.g., a piston rod end) that is directly or indirectly coupled to one or both of the moveable transcowl portions 610a or 610b at their respective rod ends 611. In some embodiments, a mechanical synchronization system 670 (e.g., a cable or shaft interlink) can interconnect the synchronized actuators 630a-630d to transmit lock loads between opposite sides of the thrust reverser system 600. The mechanical synchronization system 670 provides multiple functions. In the illustrated example, the mechanical synchronization system 670 also provides a fluid conduit that carries pressurized fluid to the synchronized actuators 630a-630d (e.g., cable or shaft that runs through the interior of a fluid conduit, a fluid conduit in which the housing can transmit mechanical torque and also allows fluid to flow through its interior). For example, the mechanical synchronization system 670 can be coupled to the actuator deploy port 420 of the example hydraulic actuator 400 of FIGS. 4, 5A and 5B to both engage mechanically with the worm wheel 532 and engage fluidly with the first fluid chamber 512. The synchronized actuators 630a and 630b are configured to provide actuation primarily to the moveable transcowl portion 610a. The synchronized actuators 630c and 630d are configured to provide actuation primarily to the moveable transcowl portion 610b.

The moveable transcowl portions 610a and 610b are operated by controllably directing pressurized fluid (e.g., hydraulic fluid) from a fluid supply line 682, to the synchronized actuators 630a-630d, and back to a fluid return line 683. Pressurized fluid is provided to a directional control valve 688. The directional control valve 688 is a hydraulic valve that is operable to direct fluid flows to the synchronized actuators 630a-630d to actuate the synchronized actuators 630a-630d and urge movement of the moveable transcowl portions 610a and 610b between a stowed configuration and a deployed configuration. For example, in one configuration of the directional control valve 688 pressurized fluid can be directed to flow to the synchronized actuators 630a-630d through a fluid conduit 694 and return through a fluid conduit 695 in order to deploy the moveable transcowl portions 610a and 610b and in another configuration of the directional control valve 688 pressurized fluid can be directed to flow to the synchronized actuators 630a-630d through a fluid conduit 695 and return through a fluid conduit 694 in order to stow the moveable transcowl portions 610a and 610b.

Figure 7:
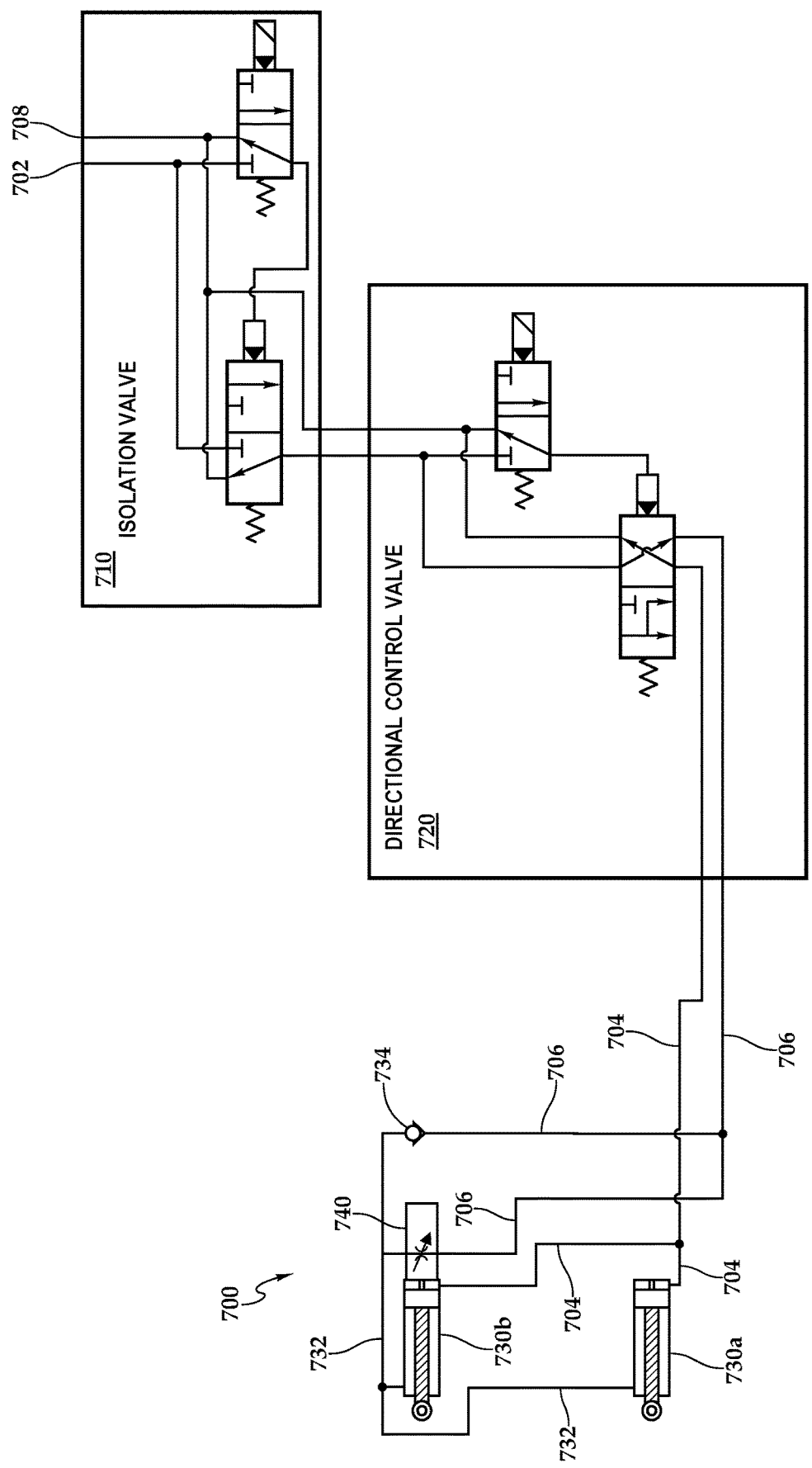
FIG. 7 is a schematic view of another example thrust reverser system.

In some embodiments, the directional control valve 688 can be a regenerative type valve. For example, in a regenerative valve, pressure can be applied simultaneously to the deploy line 694 and to the stow line 695 in order to deploy the actuators 630. An example of a directional control valve is illustrated in FIG. 7.

Describing the deployment operation in more detail, the directional control valve 688 directs pressurized fluid through the fluid conduit 694. The fluid flows to the mechanical synchronization system 670, which provides a fluid conduit that carries the fluid to an actuator deploy port 674 (and, in some embodiments, to the stow port 676, for example if the directional control valve 688 is regenerative) of each of the synchronized actuators 630a-630d. The fluid flows to the synchronized actuators 630a-630d to actuate the moveable ends 638. As the moveable ends 638 extend, fluid is urged out through an actuator stow port 676 of each of the synchronized actuators 630a-630d to a fluid conduit 672.

The synchronized actuators 630a, 630b, and 630d each have a position sensor 632 (e.g., linear variable differential transformer) coupled at their proximal ends 631. Each of the position sensors 632 is configured to sense the position of the moveable ends 638 by sensing representative movement of at least one component within the synchronized actuators 630a, 630b, and 630d. For example, the feedback screw 542 and the feedback guide 544 of the example hydraulic actuator 400 move linearly in proportion to movement of the piston 510, and the position sensor 632 can be coupled to the mount point 440 to sense and provide feedback signals that represent the position of the piston 510. One of more of the position sensors 632 is connected to a position feedback system 680 by a feedback line 682. The position feedback system 680 converts feedback signals from the position sensors 632 to information that can be used in the operation of the thrust reverser system 600. For example, the position feedback system 680 can provide an indication of the degree of deployment of the moveable transcowl portions 610a and 610b.

In some embodiments, fewer than all of the synchronized actuators 630a, 630b, and 630d can have a position sensor 632. For example, since the synchronized actuators 630a-630d are mechanically synchronized, a single one of the synchronized actuators (e.g., the synchronized actuator 630a) may include the position sensor 632 while others omit it.

The synchronized actuator 630c has a control valve 633 coupled at the proximal end 631. In the illustrated example, the control valve 633 is a hydraulic valve that is configured to be adjusted (e.g., opened, closed, partly closed) based on the position of the moveable end 638 by being adjusted by movement of at least one component within the synchronized actuator 630c. For example, as the feedback screw 542 and the feedback guide 544 of the example hydraulic actuator 400 move linearly in proportion to movement of the piston 510, and the control valve slide 552 moves proportionally in relation to the position of the piston 510 to permit, partly restrict, and/or block the fluid path between the inlet fluid port 452 and the outlet fluid port 454.

As the moveable ends 638 extend, fluid exits the synchronized actuators 630a-630d through the actuator stow ports 676 to the fluid conduit 672. Fluid flows through the fluid conduit 672 to an inlet fluid port 652 of the control valve 633. In some embodiments, the control valve 633 can be the example control valve 450 of FIGS. 4, 5A and 5B. As the moveable end 638 extends and retracts, the control valve 633 changes the amount of restriction between the inlet fluid port 652 and an outlet fluid port 654 of the control valve 633. The control valve 633 is configured such that the amount of restriction between the inlet fluid port 652 and the outlet fluid port 654 is based on the position of the moveable end 638. As such, the rate of fluid flow out of the synchronized actuators 630a-630d can range controllable from substantially unrestricted flow, to one or more predetermined restricted flow rates, to substantially blocked flow at various predetermined positions of the moveable end 638. Fluid flows out of the outlet fluid port 654 to the directional control valve 688 through the fluid conduit 695.

While the illustrated example has been described in terms of deployment, the thrust reverser system 600 can be operated in a stow mode. For example, the directional control valve 688 can be configured to flow pressurized fluid out through the fluid conduit 695 and receive returned fluid through the fluid conduit 694 to cause the synchronized actuators 630a-630d to retract the moveable transcowl portions 610a and 610b.

FIG. 7 is a schematic view of another example thrust reverser system 700. In the illustrated example, the thrust reverser system 700 is shown in a normal (e.g., stowed) in-flight condition. In general, the example thrust reverser system 700 is configured to provide controllable hydraulic resistance and/or blocking based on the position of a moveable element such as a thrust reverser transcowl (not shown) during deployment. In some embodiments, the thrust reverser system 700 can be, or can be used in place of, the example thrust reverser system 600 of FIG. 6.

The thrust reverser system 700 includes an isolation valve 710 and a directional control valve 720. The isolation valve 710 and the directional control valve 720 are hydraulic valves that are configured to direct pressurized fluid from a pressurized fluid source 702, to a deploy fluid conduit 704 and/or a stow fluid conduit 706, and direct returned fluid to a fluid return reservoir 708.

In a deploy configuration, the directional control valve 720 directs a flow of pressurized fluid to the deploy fluid conduit 704. The fluid flows through the deploy fluid conduit 704 (and, in some embodiments, to the stow line 706 in examples in which a regenerative valve configuration is used) to the deploy side of a hydraulic actuator 730a and a hydraulic actuator 730b to urge extension of the hydraulic actuators 730a, 730b. In some embodiments, the hydraulic actuators 730a and 730b can be the example hydraulic actuator 400 of FIGS. 4, 5A and 5B, or one or more of the example synchronized actuators 630a-630b of FIG. 6. As the hydraulic actuators 730a and 730b extend, fluid is urged out of the hydraulic actuators 730a and 730b to a stow fluid conduit 732. The stow fluid conduit 732 conducts the fluid to a check valve 734 and a control valve 740. The check valve 734 is configured to substantially block this directional flow, thus directing the flow to the control valve 740.

The control valve 740 is configured to provide a predetermined variable restriction in a fluid flow from the deploy fluid conduit 704 to the stow fluid conduit 706. The predetermined variable restriction is configured to be variable based on the extensile configuration of the hydraulic actuator 730b. In the illustrated example, the control valve 740 is a hydraulic valve that can provide a predetermined, deployment position-dependent restriction to fluid flow during thrust reverser transcowl deployment. In some embodiments, the control valve 740 can be the example control valve 450 of FIGS. 4, 5A and 5B.

During stow, the directional control valve 720 directs pressurized fluid to the stow fluid conduit 706 where it flows to the control valve 740 and the check valve 734. The check valve is configured to permit this directional flow, so the fluid is substantially unaffected by the control valve 740 during stow operations.

Figure 8:
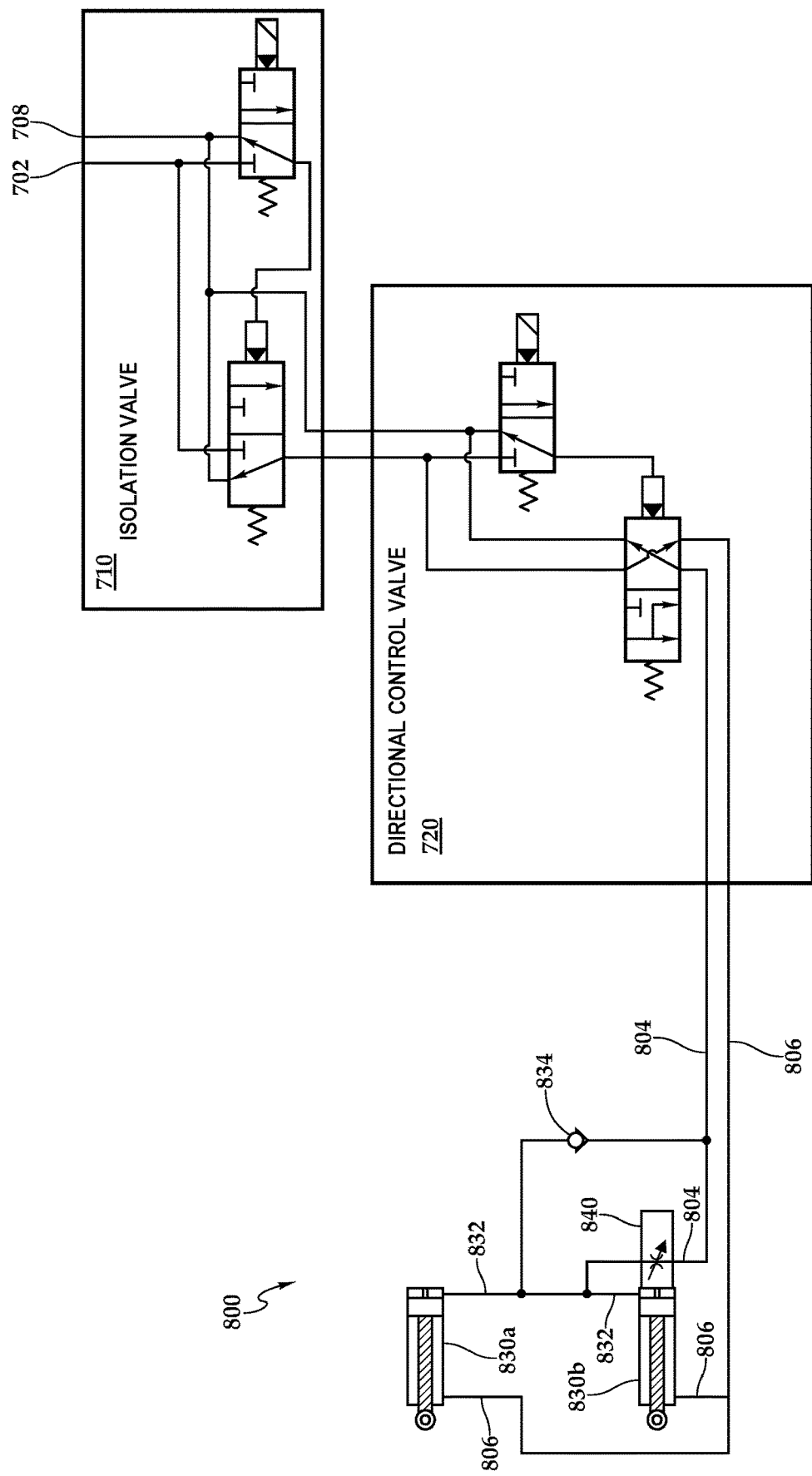
FIG. 8 is a schematic view of another example thrust reverser system.

FIG. 8 is a schematic view of another example thrust reverser system 800. In the illustrated example, the thrust reverser system 800 is shown in a normal (e.g., stowed) in-flight condition. In general, the example thrust reverser system 800 is configured to provide controllable hydraulic resistance and/or blocking based on the position of a moveable element such as a thrust reverser transcowl (not shown) during deployment. In some embodiments, the thrust reverser system 800 can be, or can be used in place of, the example thrust reverser system 600 of FIG. 6.

The thrust reverser system 800 includes the isolation valve 710 and a directional control valve 720. The isolation valve 710 and the directional control valve 720 are configured to direct pressurized fluid from the pressurized fluid source 702, to a deploy fluid conduit 804 and/or a stow fluid conduit 806, and direct returned fluid to a fluid return reservoir 708.

In a deploy configuration, the directional control valve 720 directs a flow of pressurized fluid to the stow fluid conduit 806. The fluid flows through the stow fluid conduit 806 to the stow side of a hydraulic actuator 830a and a hydraulic actuator 830b to urge retraction of the hydraulic actuators 830a, 830b. In some embodiments, the hydraulic actuators 830a and 830b can be the example hydraulic actuator 400 of FIGS. 4, 5A and 5B, or one or more of the example synchronized actuators 630a-630b of FIG. 6. As the hydraulic actuators 830a and 830b retract, fluid is urged out of the hydraulic actuators 830a and 830b to a deploy fluid conduit 832. The deploy fluid conduit 832 conducts the fluid to a check valve 834 and a control valve 840. The check valve 834 is configured to substantially block this directional flow, thus directing the flow to the control valve 840. In some embodiments, the control valve 840 can be the example control valve 450 of FIGS. 4, 5A and 5B.

The control valve 840 is a hydraulic valve that is configured to provide a predetermined variable restriction in a fluid flow from the stow fluid conduit 806 to the deploy fluid conduit 804. The predetermined variable restriction is configured to be variable based on the extensile configuration of the hydraulic actuator 830b. In the illustrated example, the control valve 840 can provide a predetermined, deployment position-dependent restriction to fluid flow during thrust reverser transcowl stowage.

During stow, the directional control valve 720 directs pressurized fluid to the deploy fluid conduit 804 where it flows to the control valve 840 and the check valve 834. The check valve is configured to permit this directional flow, so the fluid is substantially unaffected by the control valve 840 during deploy operations.

Figure 9:
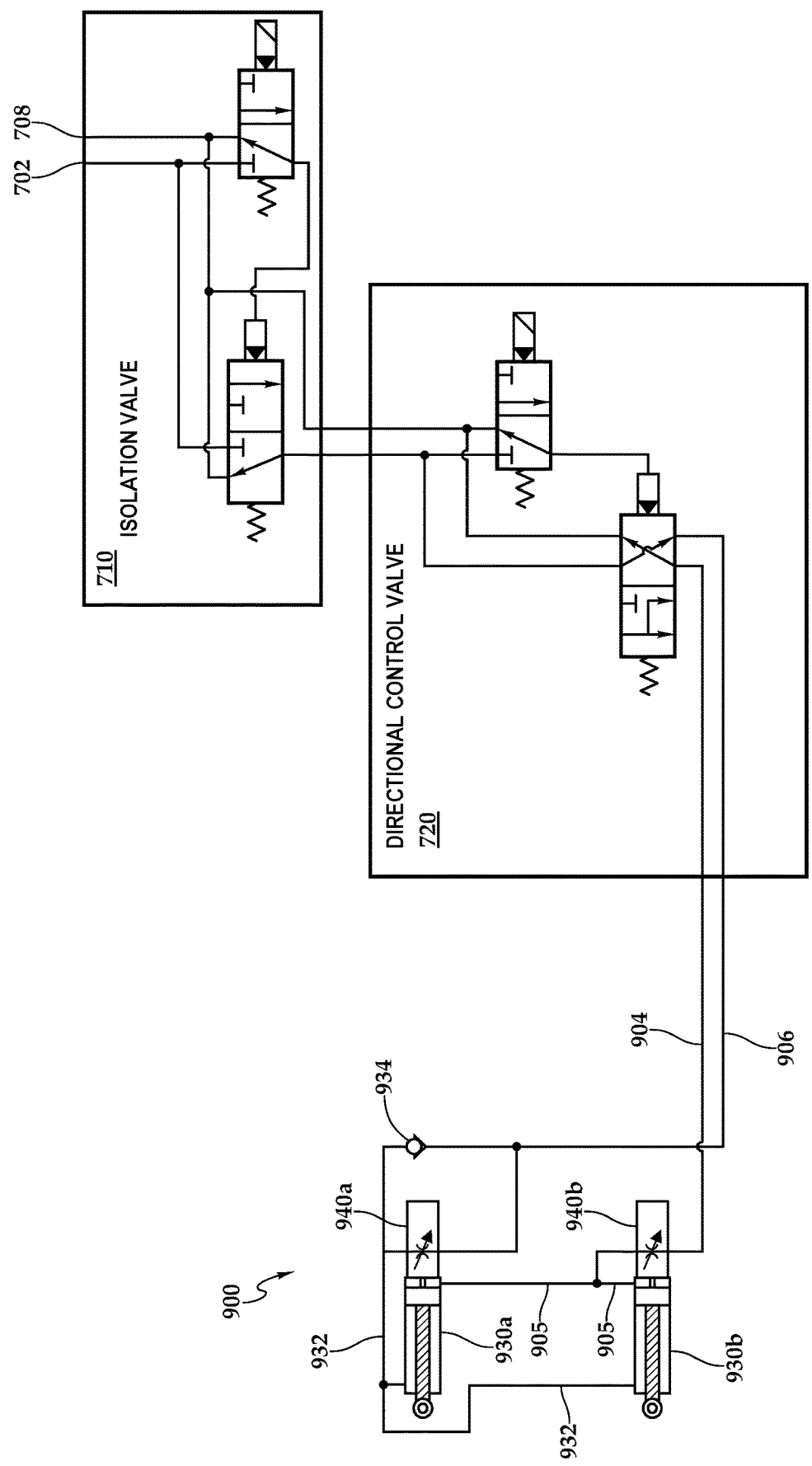
FIG. 9 is a schematic view of another example thrust reverser system.

FIG. 9 is a schematic view of another example thrust reverser system 900. In the illustrated example, the thrust reverser system 900 is shown in a normal (e.g., stowed) in-flight condition. In general, the example thrust reverser system 900 is configured to provide controllable hydraulic resistance and/or blocking based on the position of a moveable element such as a thrust reverser transcowl (not shown) during both deployment and stowage. In some embodiments, the thrust reverser system 900 can be, or can be used in place of, the example thrust reverser system 600 of FIG. 6.

The thrust reverser system 900 includes the isolation valve 710 and the directional control valve 720. In a deploy configuration, the directional control valve 720 directs a flow of pressurized fluid to the deploy fluid conduit 904 (and, in some regenerative embodiments, to the conduit 906). The fluid flows through the deploy fluid conduit 904 to a control valve 940b of a hydraulic control valve 930b. In some embodiments, in the stowed configuration of the hydraulic control valve 930b the control valve 940b can be configured to provide substantially no fluidic resistance. The deploy fluid flows through the control valve 940b to a deploy fluid conduit 905 and on to the deploy side of the hydraulic actuator 930b and a hydraulic actuator 930a to urge extension of the hydraulic actuators 930a, 930b. In some embodiments, the hydraulic actuators 930a and 930b can be the example hydraulic actuator 400 of FIGS. 4, 5A and 5B, or one or more of the example synchronized actuators 630a-630b of FIG. 6.

As the hydraulic actuators 930a and 930b extend, fluid is urged out of the hydraulic actuators 930a and 930b to a stow fluid conduit 932. The stow fluid conduit 932 conducts the fluid to a check valve 934 and a control valve 940a. The check valve 934 is configured to substantially block this directional flow, thus directing the flow to the control valve 940a. In some embodiments, the control valve 940a can be the example control valve 450 of FIGS. 4, 5A and 5B.

The control valve 940a is a hydraulic valve configured to provide a predetermined variable restriction in a fluid flow from the deploy fluid conduit 904 to the deploy fluid conduit 905. The predetermined variable restriction is configured to be variable based on the extensile configuration of the hydraulic actuator 930a. In the illustrated example, the control valve 940a can provide a predetermined, deployment position-dependent restriction to fluid flow during thrust reverser transcowl deployment.

During stow, the directional control valve 720 directs pressurized fluid to the stow fluid conduit 906 where it flows to the control valve 940a and the check valve 934. The check valve is configured to permit this directional flow, so the fluid is substantially unaffected by the control valve 940a during stow operations. As the hydraulic actuators 930a and 930b retract, fluid is urged out of the hydraulic actuators 930a and 930b to the deploy fluid conduit 905. The deploy fluid conduit 905 conducts the fluid to the control valve 940b.

The control valve 940b is a hydraulic valve configured to provide a predetermined variable restriction in a fluid flow from the deploy fluid conduit 905 to the deploy fluid conduit 904. The predetermined variable restriction is configured to be variable based on the extensile configuration of the hydraulic actuator 930b. In the illustrated example, the control valve 940b can provide a predetermined, deployment position-dependent restriction to fluid flow during thrust reverser transcowl stow.

Figure 10:
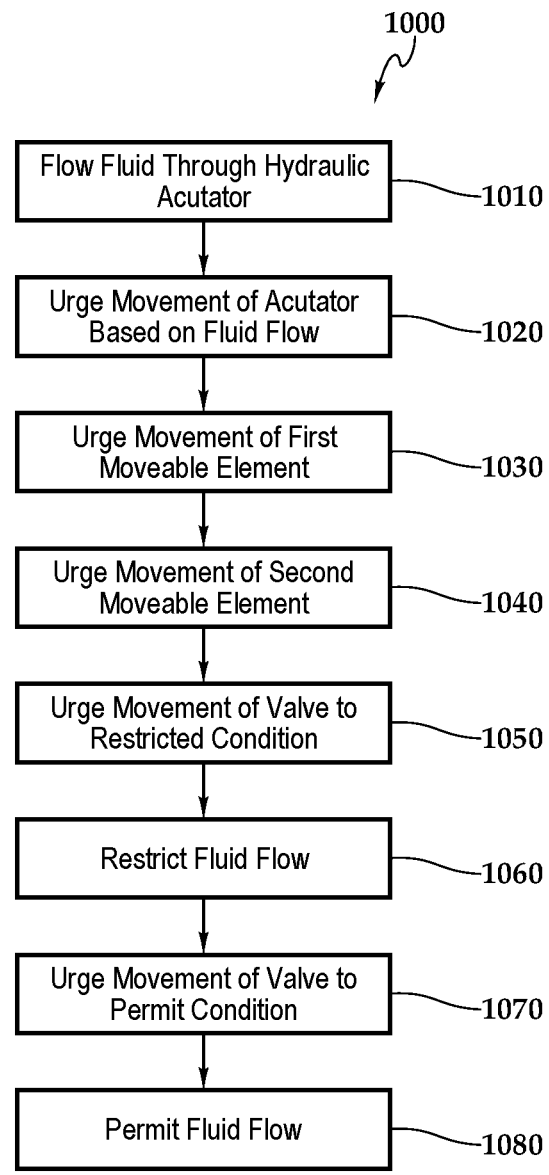
FIG. 10 is a flow diagram of an example process for using a thrust reverser.

FIG. 10 is a flow diagram of an example process 1000 for using a thrust reverser. In some implementations, the process 1000 can be a process for control hydraulic actuation of at least portions of the example turbofan jet engine assembly 10 of FIGS. 1-3, the example hydraulic actuator 400 of FIGS. 4, 5A and 5B, example thrust reverser system 600 of FIG. 6, the example thrust reverser system 700 of FIG. 7, the example thrust reverser system 800 of FIG. 8, and/or the example thrust reverser system 900 of FIG. 9.

At 1010, a hydraulic fluid flow is flowed through a hydraulic actuator. For example, in the example thrust reverser system 600 of FIG. 6, pressurized fluid flows through the fluid conduit 694 to the synchronized actuator 630c.

At 1020, a hydraulic actuator is urged to move based on the hydraulic fluid flow. For example, the fluid flow to the synchronized actuator 630c urges extension of the moveable end 638.

At 1030, the hydraulic actuator urges movement of a first moveable element into and out of a reversing position based on the hydraulic fluid flow. For example, movement of the moveable end 638 urges movement of the moveable transcowl portion 610b between the stowed configuration and the deployed configuration.

At 1040, the hydraulic actuator urges movement of a second moveable element in synchronicity with the first moveable element based on the hydraulic fluid flow. For example, as the piston 510 (e.g., the moveable end 638) of the example hydraulic actuator 400 of FIGS. 4 and 5 moves linearly, a linear-to-rotary-to-linear assembly including the piston 510, the lead screw nut 522, the lead screw 520, the feedback nut 540, the feedback screw 542, and the feedback guide 544 can urge substantially synchronous movement of the control valve slide 552 within the cavity 554.

In some implementations, urging, by the hydraulic actuator based on the hydraulic fluid flow, movement of the second moveable element in synchronicity with the first moveable element can also include moving a valve slide within a valve cavity defined by a valve housing between the permit condition wherein the valve slide and the valve housing define a fluid circuit between a fluid inlet and the fluid outlet, and the restricted condition wherein the fluid circuit is restricted. For example, movement of the feedback screw 542 and the feedback guide 544 can urge substantially synchronous movement of the control valve slide 552 within the cavity 554.

In some implementations, the process 1000 can also include providing a preconfigured variation of fluid flow rates through the fluid circuit based on movement of the valve slide, wherein the valve slide comprises a geometric profile configured to provide the preconfigured variation of fluid flow rates through the fluid circuit based on a linear position of the valve slide between the permit condition and the restricted condition. For example, the control valve slide 552 includes the profiled section 556 that is formed (e.g., machined, molded) with a geometric profile configured to provide a preconfigured variation of fluid flow rates through the fluid circuit based on a linear position of the control valve slide 552 between the permit condition and the restricted condition.

In some implementations, urging, by the hydraulic actuator based on the hydraulic fluid flow, movement of a second moveable element in synchronicity with the first moveable element can also include moving the second moveable element at a linear speed that is proportional to and different from at least one of a linear speed and a linear direction of the first moveable element. For example, the feedback nut 540 and the feedback screw 542 will thread and unthread at a speed that is proportional to the movement of the piston 510. Depending on the clockwise or counter-clockwise formation of the threads on the feedback nut 540 and the feedback screw 542 relative to the threading of the lead screw nut 522 and the lead screw 520, the feedback screw 542 can be configured to extend and retract in the same directions as the piston 510 or in the opposite directions from the piston 510.

At 1050, movement of the second moveable element urges a hydraulic valve coupled to the second moveable element to a restricted condition. At 1060, the hydraulic valve resists the hydraulic fluid flow based on the restricted condition. For example, movement of the feedback screw 542 and the feedback guide 544 can urge the control valve slide 552 to move from an initial position to a position in which the control valve 450 is configured to restrict a flow of fluid between the inlet fluid port 452 and the outlet fluid port 454 based on the position of the control valve slide 552 within the cavity 554.

At 1070, movement of the second moveable element urges the hydraulic valve to a permit condition. At 1080, the hydraulic valve permits the hydraulic fluid flow and based on the permit condition. For example, movement of the feedback screw 542 and the feedback guide 544 can urge the control valve slide 552 to move from the restricted position to a position in which the control valve 450 is configured to permit a flow of fluid between the inlet fluid port 452 and the outlet fluid port 454 based on the position of the control valve slide 552 within the cavity 554.

In some implementations, the process 1000 can also include urging, by movement of the second moveable element, the hydraulic valve to an inhibit condition, and inhibiting, by the hydraulic valve and based on the inhibit condition, the hydraulic fluid flow such that the hydraulic fluid flow is substantially blocked. For example, movement of the feedback screw 542 and the feedback guide 544 can urge the control valve slide 552 to move from an initial position to a position in which the control valve 450 is configured to substantially block flow of fluid between the inlet fluid port 452 and the outlet fluid port 454 based on the position of the control valve slide 552 within the cavity 554.

Although a few implementations have been described in detail above, other modifications are possible. For example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method of controlling hydraulic actuation comprising:
   flowing a hydraulic fluid flow through a thrust reverser fluid circuit including a hydraulic actuator;
   urging, by the hydraulic actuator based on the hydraulic fluid flow through the thrust reverser fluid circuit, movement of a first moveable element into and out of a thrust reversing position;
   urging, by the hydraulic actuator based on the hydraulic fluid flow, movement of a second moveable element in synchronicity with the first moveable element;
   urging, by movement of the second moveable element, a hydraulic valve coupled to the second moveable element, to a restricted condition;
   restricting, by the hydraulic valve and based on the restricted condition, the hydraulic fluid flow through the thrust reverser fluid circuit;
   urging, by movement of the second moveable element, the hydraulic valve to a permit condition; and
   permitting, by the hydraulic valve and based on the permit condition, the hydraulic fluid flow through the thrust reverser fluid circuit.

2. The method of claim 1, further comprising:
   urging, by movement of the second moveable element, the hydraulic valve to an inhibit condition; and
   inhibiting, by the hydraulic valve and based on the inhibit condition, the hydraulic fluid flow such that the hydraulic fluid flow is substantially blocked.

3. The method of claim 1, wherein urging, by the hydraulic actuator based on the hydraulic fluid flow, movement of the second moveable element in synchronicity with the first moveable element further comprises moving a valve slide within a valve cavity defined by a valve housing between the permit condition wherein the valve slide and the valve housing define a fluid circuit between a fluid inlet and a fluid outlet, and the restricted condition wherein the fluid circuit is restricted.

4. The method of claim 3, further comprising providing a preconfigured variation of fluid flow rates through the fluid circuit based on movement of the valve slide, wherein the valve slide comprises a geometric profile configured to provide the preconfigured variation of fluid flow rates through the fluid circuit based on a linear position of the valve slide between the permit condition and the restricted condition.

5. The method of claim 1, wherein urging, by the hydraulic actuator based on the hydraulic fluid flow, movement of the second moveable element in synchronicity with the first moveable element further comprises moving the second moveable element at a second linear speed that is proportional to and different from a first linear speed of the first moveable element.

6. The method of claim 1, wherein a turbofan engine assembly comprises a turbofan engine, a nacelle surrounding the turbofan engine and defining an annular bypass duct through the turbofan engine to define a generally forward-to-aft bypass air flow path, and a thrust reverser comprising the first moveable element, wherein the first moveable element is coupled to the hydraulic actuator, the second moveable element, and the hydraulic valve.

7. The method of claim 1, wherein flowing the hydraulic fluid flow through the hydraulic actuator comprises controlling, by another hydraulic valve, the hydraulic fluid flow through the hydraulic actuator.

8. The method of claim 1, wherein the hydraulic valve comprises:
- a valve housing defining a valve cavity;
- a fluid inlet;
- a fluid outlet; and
- a valve slide configured for reciprocal movement within the valve cavity between the permit condition and the restricted condition.

9. The method of claim 8, wherein the valve housing is coupled to a thrust reverser and the valve slide is operably coupled to the second moveable element.

10. The method of claim 8, wherein the valve slide comprises a geometric profile configured to provide a pre-configured variation of fluid flow rates through the fluid circuit based on a linear position of the valve slide between the permit condition and the restricted condition.

11. The method of claim 1, wherein:
- urging, by the hydraulic actuator based on the hydraulic fluid flow, movement of the first moveable element into and out of the reversing position comprises moving the first moveable element in a first linear direction; and
- urging, by the hydraulic actuator based on the hydraulic fluid flow, movement of the second moveable element in synchronicity with the first moveable element further comprises moving the second moveable element in a second linear direction that is different from the first linear direction.

12. The method of claim 1, wherein:
- urging, by the hydraulic actuator based on the hydraulic fluid flow, movement of the first moveable element into and out of the reversing position comprises moving the first moveable element at a first linear speed; and
- urging, by the hydraulic actuator based on the hydraulic fluid flow, movement of the second moveable element in synchronicity with the first moveable element further comprises moving the second moveable element at a second linear speed that is different from the first linear speed.

13. The method of claim 1, further comprising:
- rotating, by movement of the first moveable element, rotation of a screw of a screw assembly coupled to a linear-to-rotary drive assembly;
- threading and unthreading, by the rotation, the screw to linearly extend and linearly retract the screw based on rotation of the linear-to-rotary drive assembly;
- contacting, by a guide plate, the screw on a first side;
- contacting, by the guide plate, the hydraulic valve on a second side opposite the first side; and
- moving the hydraulic valve linearly based on linear extension and linear retraction of the screw.

14. The method of claim 1, wherein the hydraulic fluid flow is partly blocked by the hydraulic valve in the restricted condition.

15. The method of claim 1, wherein the hydraulic fluid flow is substantially unblocked by the hydraulic valve in the permit condition.

\* \* \* \* \*

UNITED STATES PATENT AND TRADEMARK OFFICE
CERTIFICATE OF CORRECTION

| | |
|---|---|
| PATENT NO. | : 11,255,294 B2 |
| APPLICATION NO. | : 16/884995 |
| DATED | : February 22, 2022 |
| INVENTOR(S) | : Kopecek |

It is certified that error appears in the above-identified patent and that said Letters Patent is hereby corrected as shown below:

In the Specification

Column 8, Line 11, delete "554)" and insert -- 554 --;

Column 9, Line 1, delete "oufflow" and insert -- outflow --;

Column 9, Lines 5-6, delete "oufflow" and insert -- outflow --;

Column 14, Line 46, delete "4 and 5" and insert -- 4, 5A and 5B --.

Signed and Sealed this
Twelfth Day of July, 2022

Katherine Kelly Vidal
*Director of the United States Patent and Trademark Office*